US012494242B2

(12) United States Patent
Vimercati et al.

(10) Patent No.: US 12,494,242 B2
(45) Date of Patent: Dec. 9, 2025

(54) MEMORY CELL SENSING ARCHITECTURE

(71) Applicant: Micron Technology, Inc., Boise, ID (US)

(72) Inventors: Daniele Vimercati, El Dorado Hills, CA (US); Eric Carman, San Francisco, CA (US)

(73) Assignee: Micron Technology, Inc., Boise, ID (US)

( * ) Notice: Subject to any disclaimer, the term of this patent is extended or adjusted under 35 U.S.C. 154(b) by 154 days.

(21) Appl. No.: 18/403,498

(22) Filed: Jan. 3, 2024

(65) Prior Publication Data

US 2024/0257855 A1 Aug. 1, 2024

Related U.S. Application Data

(60) Provisional application No. 63/441,317, filed on Jan. 26, 2023.

(51) Int. Cl.
*G11C 11/22* (2006.01)
*G11C 5/06* (2006.01)
*G11C 5/10* (2006.01)

(52) U.S. Cl.
CPC ............ *G11C 11/221* (2013.01); *G11C 5/063* (2013.01); *G11C 5/10* (2013.01); *G11C 11/2273* (2013.01)

(58) Field of Classification Search
CPC ......... G11C 11/221; G11C 5/063; G11C 5/10; G11C 11/2273
See application file for complete search history.

(56) References Cited

U.S. PATENT DOCUMENTS 10,692,557 B1 * 6/2020 Bolandrina ......... G11C 11/2293
2005/0063213 A1 * 3/2005 Jacob ..................... G11C 29/50
365/145

\* cited by examiner

*Primary Examiner* — Han Yang
(74) *Attorney, Agent, or Firm* — Holland & Hart LLP

(57) ABSTRACT

Techniques and configurations for electronic memory are described. An apparatus may include a first set of memory cells coupled with a first plate line and a word line, where a memory cell in the first set of memory cells may be coupled with a first bit line, and a second set of memory cells coupled with a second plate line and the word line, where a memory cell of the second set of memory cells may be coupled with a second bit line. The apparatus may also include a sense component having a first node coupled with the first bit line and a first capacitor and a second node coupled with the second bit line and a second capacitor. Also, a set of capacitors may be coupled with both nodes. The capacitors may support adjustment of the voltage of the nodes of the sense component.

20 Claims, 8 Drawing Sheets

MEMORY CELL SENSING ARCHITECTURE

CROSS REFERENCE

The present Application for Patent claims the benefit of U.S. Provisional Patent Application No. 63/441,317 by VIMERCATI et al., entitled "MEMORY CELL SENSING ARCHITECTURE," filed Jan. 26, 2023, assigned to the assignee hereof, and expressly incorporated by reference in its entirety herein.

TECHNICAL FIELD

The following relates to one or more systems for memory, including memory cell sensing architecture.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source. FeRAM may be able to achieve densities similar to volatile memory but may have non-volatile properties due to the use of a ferroelectric capacitor as a storage device.

DETAILED DESCRIPTION

A memory device may use memory cell pairs that include two memory cells that store complementary logic values to store a single logic value. For example, to store a logic value 1, a first memory cell in the pair may store a first charge state (which may correspond to a logic value 1) and a second memory cell in the pair may store a second charge state (which may correspond to a logic value 0). And to store a logic value 0, the first memory cell in the pair may store the second charge state and the second memory cell in the pair may store the first charge state. Accordingly, the paired memory cells may provide differential signals for a differential sensing operation (e.g., based on a difference between the first charge state and the second charge state) used to determine a logic value stored by the storage device. However, using multiple memory cells to store a single logic value may reduce a storage density of a memory device (e.g., by 50%) as two memory cells are used to store one bit of data rather than two bits of data. Thus, alternative storage and sensing schemes for such memory cell pairs that increase a storage density of the memory device while maintaining reliable differential sensing attributes may be desired.

To increase a storage density of a memory die configured with memory cell pairs, enhanced storage techniques may be used to enable each memory cell in the memory die to independently store a logic value. Also, to maintain differential sensing attributes, different memory cell pairs may be used to generate signals (e.g., a data signal and reference signal) for a differential sensing operation. In some examples, the enhanced storage techniques may include transferring the charge of a first memory cell in a first memory cell pair to a first bit line and using, as a reference, a voltage of another bit line coupled with a second memory cell pair that is coupled with a same word line as the first memory cell pair.

Figure 1:
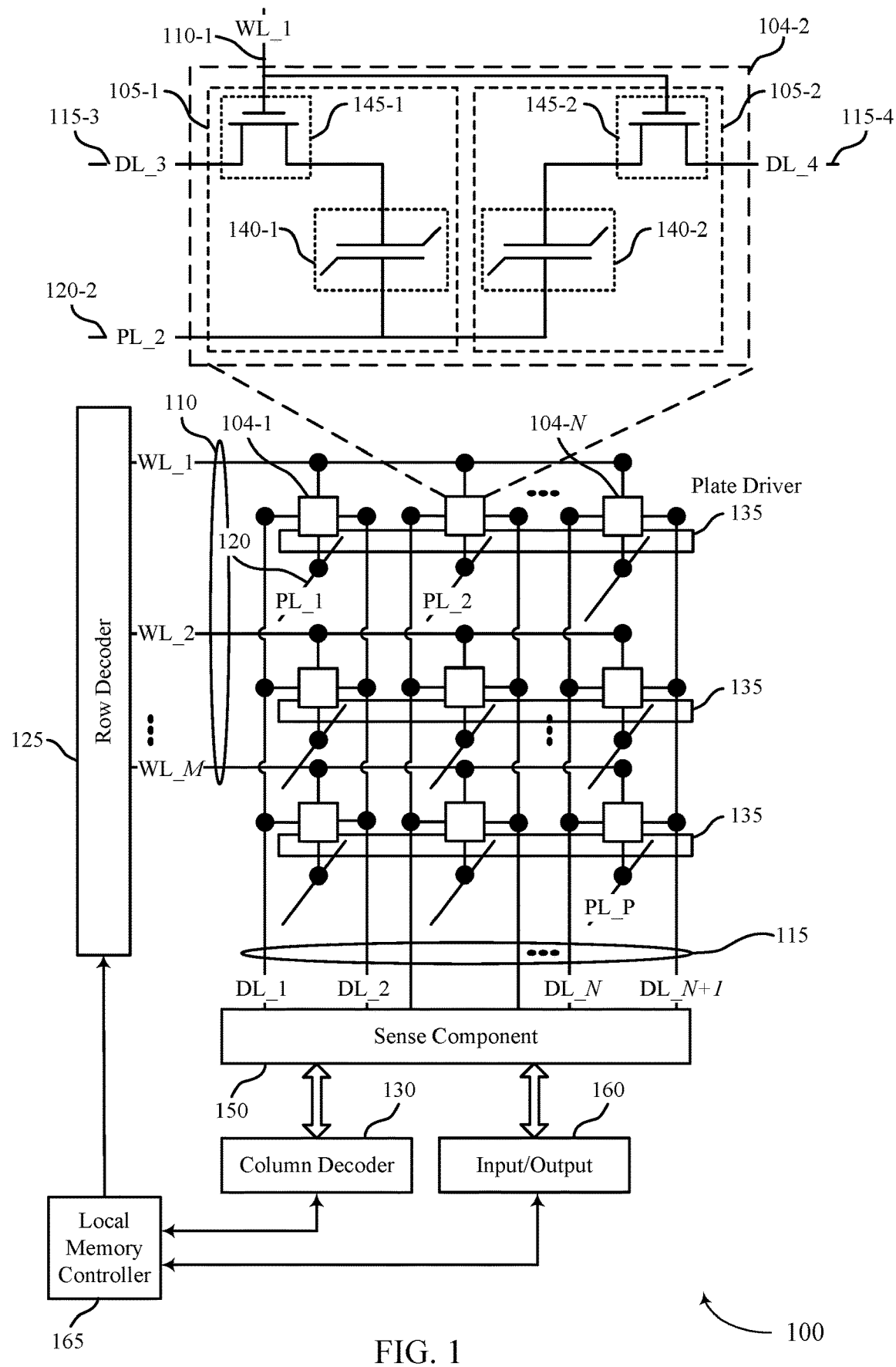
FIG. 1 illustrates an example of a memory die that supports a memory cell sensing architecture in accordance with examples as disclosed herein.

FIG. 1 illustrates an example of a memory die 100 that supports a memory cell sensing architecture in accordance with examples as disclosed herein. In some examples, the memory die 100 may be referred to as a memory chip, a memory device, or an electronic memory apparatus. The memory die 100 may include one or more memory cells 105 that may each be programmable to store different logic states (e.g., programmed to one of a set of two or more possible states). For example, a memory cell 105 may be operable to store one bit of information at a time (e.g., a logic 0 or a logic 1). In some examples, a memory cell 105 (e.g., a multi-level memory cell) may be operable to store more than one bit of information at a time (e.g., a logic 00, logic 01, logic 10, a logic 11).

In some examples, a memory cell 105 may store a state (e.g., a polarization state, a dielectric charge) representative of the programmable states in a capacitor. The memory cell 105 may include a logic storage component, such as capacitor 140, and a switching component 145 (e.g., a cell selection component). A first node of the capacitor 140 may be coupled with the switching component 145 and a second node of the capacitor 140 may be coupled with a plate line 120. The switching component 145 may be an example of a transistor or any other type of switch device that selectively establishes or de-establishes electronic communication between two components. In FeRAM architectures, the memory cell 105 may include a capacitor 140 (e.g., a ferroelectric capacitor) that includes a ferroelectric material to store a charge (e.g., a polarization) representative of the programmable state.

The memory die 100 may include access lines (e.g., word lines 110, bit lines 115, plate lines 120) arranged in a pattern, such as a grid-like pattern. An access line may be a conductive line coupled with a memory cell 105 and may be used to perform access operations on the memory cell 105. In some examples, word lines 110 may be referred to as row lines. In some examples, bit lines 115 may be referred to as column lines or digit lines. References to access lines, row lines, column lines, word lines, digit lines, bit lines, or plate lines, or their analogues, are interchangeable without loss of understanding. Memory cells 105 may be positioned at intersections of the word lines 110, the bit lines 115, or the plate lines 120.

Operations such as reading and writing may be performed on memory cells 105 by activating access lines such as a word line 110, a bit line 115, or a plate line 120. By biasing a word line 110, a bit line 115, and a plate line 120 (e.g., applying a voltage to the word line 110, bit line 115, or plate line 120), a single memory cell 105 may be accessed at their intersection. The intersection of a word line 110 and a bit line 115 in a two-dimensional or in a three-dimensional configuration may be referred to as an address of a memory cell 105. Activating a word line 110, a bit line 115, or a plate line 120 may include applying a voltage to the respective line.

Accessing the memory cells 105 may be controlled through a row decoder 125, a column decoder 130, a plate driver 135, or any combination thereof. For example, a row decoder 125 may receive a row address from the local memory controller 165 and activate a word line 110 based on the received row address. A column decoder 130 may receive a column address from the local memory controller 165 and activate a bit line 115 based on the received column address. A plate driver 135 may receive a plate address from the local memory controller 165 and activate a plate line 120 based on the received plate address.

Selecting or deselecting the memory cell 105 may be accomplished by activating or deactivating the switching component 145. The capacitor 140 may be in electronic communication with the bit line 115 using the switching component 145. For example, the capacitor 140 may be isolated from bit line 115 when the switching component 145 is deactivated, and the capacitor 140 may be coupled with bit line 115 when the switching component 145 is activated.

A word line 110 may be a conductive line in electronic communication with a memory cell 105 that is used to perform access operations on the memory cell 105. In some architectures, the word line 110 may be in electronic communication with a gate of a switching component 145 of a memory cell 105 and may be operable to control the switching component 145 of the memory cell. In some architectures, the word line 110 may be in electronic communication with a node of the capacitor of the memory cell 105 and the memory cell 105 may not include a switching component.

A bit line 115 may be a conductive line that couples the memory cell 105 with a sense component 150. In some architectures, the memory cell 105 may be selectively coupled with the bit line 115 during portions of an access operation. For example, the word line 110 and the switching component 145 of the memory cell 105 may be operable to selectively couple or isolate the capacitor 140 of the memory cell 105 and the bit line 115. In some architectures, the memory cell 105 may be in electronic communication (e.g., constant) with the bit line 115.

A plate line 120 may be a conductive line in electronic communication with a memory cell 105 that is used to perform access operations on the memory cell 105. The plate line 120 may be in electronic communication with a node (e.g., the cell bottom) of the capacitor 140. The plate line 120 may cooperate with the bit line 115 to bias the capacitor 140 during access operation of the memory cell 105.

The sense component 150 may determine a state (e.g., a polarization state, a charge) stored on the capacitor 140 of the memory cell 105 and determine a logic state of the memory cell 105 based on the detected state. The sense component 150 may include one or more sense amplifiers to amplify (e.g., latch) the signal output of the memory cell 105. The sense component 150 may compare the signal received from the memory cell 105 via the bit line 115 to a reference (e.g., a reference voltage provided via another bit line). The detected logic state of the memory cell 105 may be provided as an output of the sense component 150 (e.g., to an input/output 160), and may indicate the detected logic state to another component of a memory device that includes the memory die 100.

The local memory controller 165 may control the operation of memory cells 105 through the various components (e.g., row decoder 125, column decoder 130, plate driver 135, and sense component 150). In some examples, one or more of the row decoder 125, column decoder 130, and plate driver 135, and sense component 150 may be co-located with the local memory controller 165. The local memory controller 165 may be operable to receive one or more of commands or data from one or more different memory controllers (e.g., an external memory controller associated with a host device, another controller associated with the memory die 100), translate the commands or the data (or both) into information that can be used by the memory die 100, perform one or more operations on the memory die 100, and communicate data from the memory die 100 to a host device based on performing the one or more operations. The local memory controller 165 may generate row signals and column address signals to activate the target word line 110, the target bit line 115, and the target plate line 120. The local memory controller 165 also may generate and control various signals (e.g., voltages, currents) used during the operation of the memory die 100. In general, the amplitude, the shape, or the duration of an applied voltage or current discussed herein may be varied and may be different for the various operations discussed in operating the memory die 100.

The local memory controller 165 may be operable to perform one or more access operations on one or more memory cells 105 of the memory die 100. Examples of access operations may include a write operation, a read operation, a refresh operation, a precharge operation, or an activate operation, among others. In some examples, access operations may be performed by or otherwise coordinated by the local memory controller 165 in response to various access commands (e.g., from a host device). The local memory controller 165 may be operable to perform other access operations not listed here or other operations related to the operation of the memory die 100 that are not directly related to accessing the memory cells 105.

The local memory controller 165 may be operable to perform a write operation (e.g., a programming operation) on one or more memory cells 105 of the memory die 100. During a write operation, a memory cell 105 of the memory die 100 may be programmed to store a desired state (e.g., logic state, charge state). The local memory controller 165 may identify a target memory cell 105 on which to perform the write operation. The local memory controller 165 may identify a target word line 110 and a target bit line 115 coupled with the target memory cell 105 (e.g., an address of the target memory cell 105). The local memory controller 165 may activate the target word line 110 and the target bit line 115 (e.g., applying a voltage to the word line 110 or bit line 115) to access the target memory cell 105. The local memory controller 165 may apply a signal (e.g., a write pulse, a write voltage) to the bit line 115 during the write operation to store a specific state (e.g., charge) in the capacitor 140 of the memory cell 105. The signal used as part of the write operation may include one or more voltage levels over a duration.

The local memory controller 165 may be operable to perform a read operation (e.g., a sense operation) on one or more memory cells 105 of the memory die 100. During a read operation, the state (e.g., logic state, charge state, polarization state) stored in a memory cell 105 of the memory die 100 may be evaluated (e.g., read, determined, identified). The local memory controller 165 may identify a target memory cell 105 on which to perform the read operation. The local memory controller 165 may identify a target word line 110, a target bit line 115, and target plate line 120 coupled with the target memory cell 105. The local memory controller 165 may activate the target word line 110, the target bit line 115, and the target plate line 120 (e.g., applying a voltage to the word line 110, bit line 115, or plate line 120) to access the target memory cell 105. The target memory cell 105 may transfer a signal (e.g., charge, voltage) to the sense component 150 in response to biasing the access lines. The sense component 150 may amplify the signal. The local memory controller 165 may activate the sense component 150 (e.g., activate a latch of the sense component 150), which may compare the signal received from the memory cell 105 to a reference (e.g., provided via another bit line). Based on that comparison, the sense component 150 may determine a logic state that is stored on the memory cell 105.

In some examples, the memory die 100 may be configured with an array of memory cell pairs (such as the first memory cell pair 104-1 and the second memory cell pair 104-2), where each of the memory cell pairs may be composed of two memory cells, which may also be referred to as sub-memory cells. For example, the second memory cell pair 104-2 may include the first memory cell 105-1 and the second memory cell 105-2. The memory cells may each include a switching component (e.g., the first memory cell 105-1 may include the first switching component 145-1 and the second memory cell 105-2 may include the second switching component 145-2) and a storage element (e.g., the first memory cell 105 may include the first capacitor 140-1 and the second memory cell 105-2 may include the second capacitor 140-2). Thus, each memory cell pair may include two switching components and two storage elements. In such cases, a single word line (e.g., the first word line 110-1) and a single plate line (e.g., the second plate line 120-2) may be used to access both memory cells in a memory cell pair (e.g. the second memory cell pair 104-2), where a first memory cell (e.g., the first memory cell 105-1) may be coupled with a first bit line (e.g., bit line DL_3) and a second memory cell (e.g., the second memory cell 105-2) may be coupled with a second bit line (e.g., bit line DL_4).

In some examples, a memory cell pair (e.g., the second memory cell pair 104-2) in the memory die 100, may be used to store a single logic value—e.g., by programming memory cells to store opposite charge states that are representative of a single logic value. For example, for the second memory cell pair 104-2 to store a logic value 1, the first memory cell 105-1 may be configured to store a first charge state (which may correspond to a logic value 1) and the second memory cell 105-2 may be configured to store a second charge state (which may correspond to a logic value 0). Similarly, for the second memory cell pair 104-2 to store a logic value 0, the first memory cell 105-1 may be configured to store the second charge state, and the second memory cell 105-2 may be configured to store the first charge state. Accordingly, the sense component 150 (e.g., a sense amplifier in the sense component 150) may determine a logic value stored by the memory cell pair by comparing a voltage of the third bit line 115-3 resulting from releasing the charge of the first capacitor 140-1 and a voltage of the fourth bit line 115-4 resulting from releasing the charge of the second capacitor 140-2. Benefits associated with using multiple memory cells to store a single logic value include increasing a reliability of a sensing operation—e.g., as a differential sensing operation with an increased sensing window may be performed for a memory cell pair.

However, using multiple memory cells to store a single logic value may reduce a storage density of the memory die 100 (e.g., by 50%) as two memory cells are used to store one bit of data rather than two bits of data. Thus, alternative storage and sensing schemes that increase a storage density of a memory die configured with memory cell pairs that each have two memory cells while maintaining reliable sensing attributes may be desired.

To increase a storage density of a memory die configured with memory cell pairs, enhanced storage techniques may be used to enable each memory cell in the memory die to independently store a logic value. Also, to maintain differential sensing attributes, memory cell pairs that are connected to a same word line may be used to provide signals for a differential sensing operation. In some examples, the enhanced storage techniques may include transferring the charge of a first memory cell in a first memory cell pair to a first bit line and using, as a reference, a voltage of another bit line coupled with a second memory cell pair that is coupled with a same word line as the first memory cell pair.

In some examples, the memory die 100 includes a first set of memory cells (e.g., the first memory cell 105-1 and the second memory cell 105-2) and a second set of memory cells, where a first memory cell (e.g., the first memory cell 105-1) of the first set of memory cells may be coupled with a first bit line (e.g., the third bit line 115-3, DL_3). The memory die 100 may also include a second set of memory cells (e.g., within the nth memory cell pair 104-N), where a memory cell of the second set of memory cells may be coupled with a second bit line (e.g., DL_N). The memory die 100 may additionally include the sense component 150, where a first node of a sense amplifier/latch of a sense amplifier in the sense component 150 may be selectively coupled with the first bit line (e.g., DL_3) and a second node of the sense amplifier/latch may be selectively coupled with the second bit line (e.g., DL_N), where the second bit line may operate as a reference for the first bit line. In some examples, voltage adjustments may be applied (e.g., via capacitors) to the first bit line and the second bit line to compensate for voltages that develop on the bit lines due to parasitic circuit elements, latch offsets, and the like.

By using, as a reference, a second bit line that is coupled with a second memory cell pair, a single memory cell in a different first memory cell pair may be accessed and a resulting voltage of a first bit line may be compared against a voltage of the second bit line. In some examples, based on being connected to a same word line and being located in a same section, the first bit line and the second bit line may experience similar voltage perturbations caused by an access operation.

Figure 2:
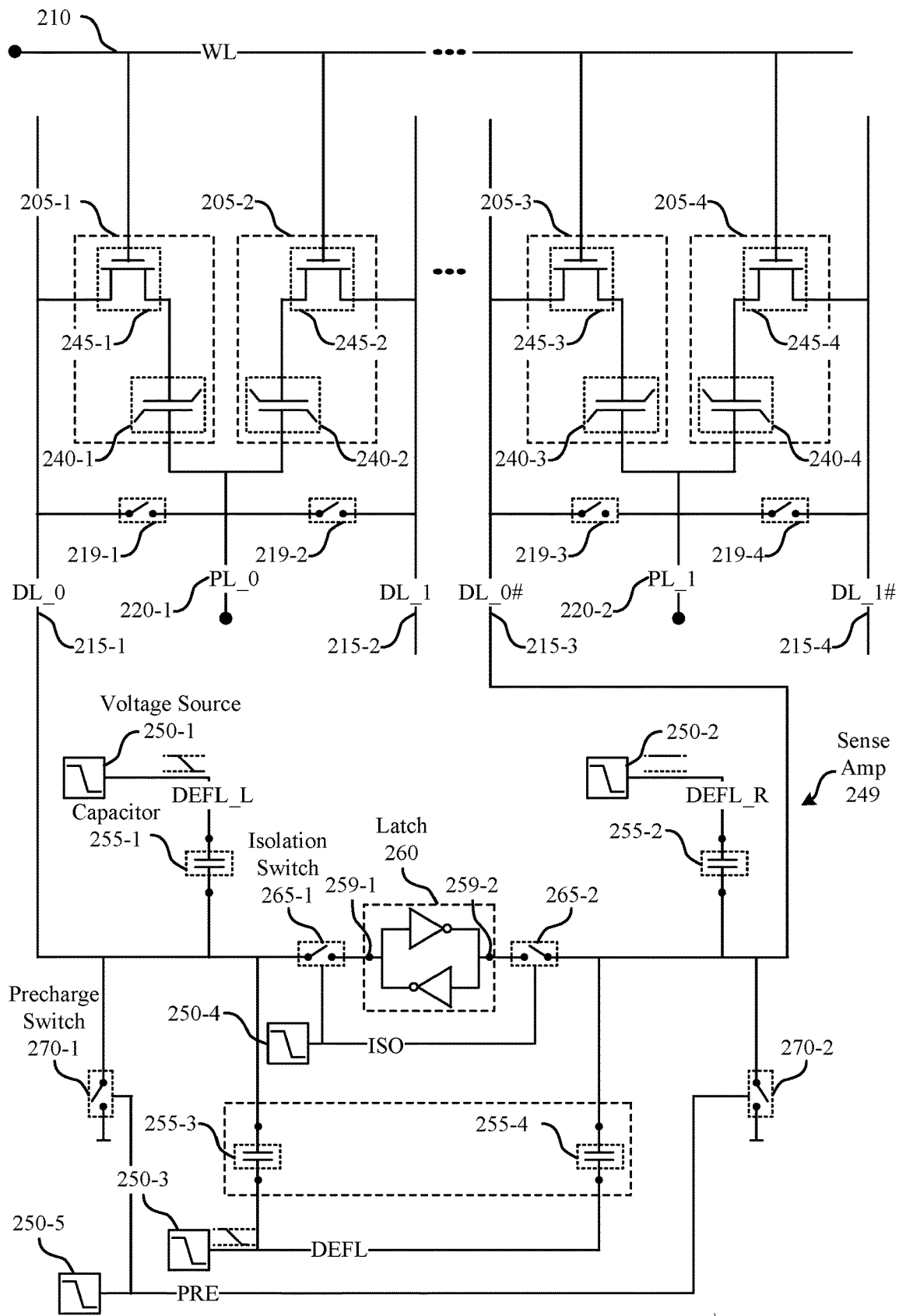
FIG. 2 illustrates an example of a subsystem that supports a memory cell sensing architecture in accordance with examples as disclosed herein.

FIG. 2 illustrates an example of a subsystem that supports a memory cell sensing architecture in accordance with examples as disclosed herein.

The subsystem 200 may include the memory cells 205, the word line 210, the bit lines 215, the plate line 220, the sense amplifier 249, and the voltage sources 250. The sense amplifier 249 may include the capacitors 255, the latch 260, the isolation switches 265, and the precharge switches 270. The subsystem 200 may depict aspects of the memory die 100 described with reference to FIG. 1. For example, the first memory cell pair 104-1 of FIG. 1 may include the first memory cell 205-1 and the second memory cell 205-2. And the nth memory cell pair 104-N may include the third memory cell 205-3 and the fourth memory cell 205-4.

The memory cells 205 may be configured to independently store logic values. Each of the memory cells 205 may include a switching component and a ferroelectric capacitor, as described herein, including with reference to FIG. 1. As depicted in FIG. 2, a first set of memory cells (the first memory cell 205-1 and the second memory cell 205-2) and a second set of memory cells (the third memory cell 205-3 and the fourth memory cell 205-4) may each be configured as memory cell pairs.

The bit lines 215 may be configured to accept charge released from the memory cells 205. The first memory cell 205-1 may be coupled with the first bit line 215-1, the second memory cell may be coupled with the second bit line 215-2, the third memory cell 205-3 may be coupled with the third bit line 215-3, and the fourth memory cell 205-4 may be coupled with the fourth bit line 215-4. In some examples, the bit lines 215 may be configured as reference bit lines. In some examples, the first bit line 215-1 may be labeled as DL0 and the third bit line 215-3 may be labeled as DL0# to indicate that the third bit line 215-3 corresponds to a reference for the first bit line 215-1. Thus, the third bit line 215-3 may be used as a sensing reference for the first bit line 215-1, and vice versa. Accordingly, the first bit line 215-1 may be selectively coupled with the first node 259-1 of the latch 260 and the third bit line 215-3 may be selectively coupled with the second node 259-2 of the latch 260.

The plate lines 220, in combination with the word line 210, may be configured to trigger one or more of the memory cells 205 to release charge to the bit line 215. The first memory cell 205-1 and the second memory cell 205-2 may be coupled with the first plate line 220-1. And the third memory cell 205-3 and the fourth memory cell 205-4 may be coupled with the second plate line 220-2. The first memory cell 205-1, the second memory cell 205-2, the third memory cell 205-3, and the fourth memory cell 205-4 may each be coupled with the word line 210.

In some examples, switches (e.g., the first switch 219-1, the second switch 219-2, the third switch 219-3, and the fourth switch 219-4) may be configured between the plate lines 220 and the bit lines 215. The switches 219 may be used to selectively couple respective plate lines and bit lines—e.g., so that a voltage of a plate line and bit line may be driven to an equivalent voltage.

The latch 260 may be configured to compare a voltage at the first node 259-1 of the latch 260 (that corresponds to a voltage of a first bit line, such as the first bit line 215-1) with a voltage at the second node 259-2 of the latch 260 (that corresponds to a voltage of a second bit line, such as the second bit line 215-2). In some examples, to compare the voltage of the first node 259-1 and the second node 259-2, voltages are allowed to develop at the first node 259-1 and the second node 259-2 while the latch 260 is in an off state. After the voltages develop, the latch 260 may be turned on, and based on the states of the voltages, the latch 260 may power up in one of two states. For example, if the voltage of the first node 259-1 is higher than the voltage of the second node 259-2 (e.g., by an amount greater than a difference in threshold voltages of the transistors in the latch), the latch may power up in a first state where an output of the latch 260 is driven to a high voltage (which may correspond to a logic value 1). Or, if the voltage of the first node 259-1 is lower than the voltage of the second node 259-2, the latch may power up in a second state where an output of the latch 260 is driven to a low voltage (which may correspond to a logic value 0). Accordingly, the latch 260 may be configured to latch a resulting voltage that indicates a logic state corresponding to a memory cell that is coupled with the first node 259-1 of the latch 260 (e.g., the first memory cell 205-1). In some examples, the latch 260 may be similarly couplable with additional pairs of bit lines (e.g., the second bit line 215-2 and the fourth bit line 215-4). Additionally, or alternatively, the other pairs of bit lines may be coupled with other sense amplifiers that include separate latches.

In some examples, an output of the latch 260 may be inverted based on which side of the latch 260 an accessed memory cell is connected to—e.g., via a bit line. For example, if the accessed memory cell is connected to the second node 259-2 of the latch, then an output of the latch may be inverted to determine a logic value stored by the accessed memory cell. In some examples, a memory controller keeps track of which side of a latch accessed memory cells are connected to and determines whether to invert an output of the latches accordingly.

The capacitors 255 may be configured to store charge that is representative of voltage differences between bit lines and voltage sources, while also isolating the bit lines from the voltage sources. The first capacitor 255-1 (a first node of the first capacitor 255-1) may be coupled with the first voltage source 250-1 and (a second node of the first capacitor 255-1) may be coupled with the first bit line 215-1. The second capacitor 255-2 (a first node of the second capacitor 255-2) may be coupled with the second voltage source 250-2 and (a second node of the second capacitor 255-2) may be coupled with the third bit line 215-3. The third capacitor 255-3 (a first node of the third capacitor 255-3) may be coupled with the third voltage source 250-3 and (a second node of the third capacitor 255-3) may be coupled with the first bit line 215-1. The fourth capacitor 255-4 (a first node of the fourth capacitor 255-4) may be coupled with the third voltage source 250-3 and (a second node of the fourth capacitor 255-4) may be coupled with the third bit line 215-3.

The voltage sources 250 may be configured to provide variable voltages that can be used to control aspects of the subsystem 200. For example, the voltage sources 250 may be configured to provide voltages for opening and closing switches, for adjusting voltages applied to capacitors, adjusting voltages of the bit lines, and the like. In some examples, together with the capacitors 255, the voltage sources 250 may be configured to adjust voltages of the bit lines based on voltages that have developed on the bit lines. For example, a voltage of the first bit line 215-1 and a voltage of the third bit line 215-3 that develop as a result of an offset of the latch 260 may be compensated for by adjusting (e.g., reducing) a voltage of the first voltage source 250-1.

The isolation switches 265 (including the first isolation switch 265-1 and the second isolation switch 265-2) may be configured to isolate the latch 260 from the bit lines—e.g., up until the latch 260 is power on. The precharge switches 270 (including the first precharge switch 270-1 and the second precharge switch 270-2) may be configured to connect the bit lines to a reference voltage (e.g., a ground reference voltage) to remove parasitic charge that develops on the bit lines during operation and to ensure that a full sensing voltage is applied across a storage element (e.g., the first storage element 240-1) when a select transistor (e.g., the first select transistor 245-1) is activated.

Figure 3:
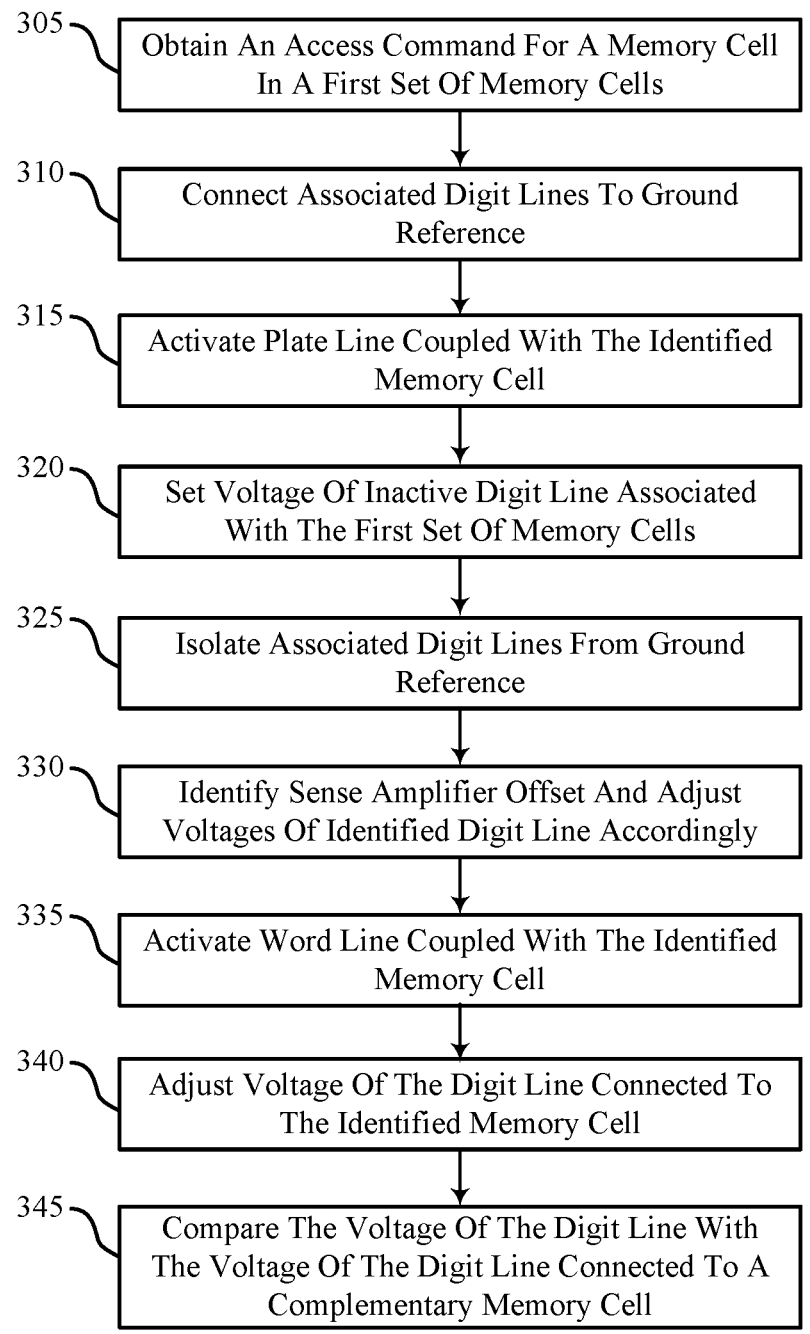
FIG. 3 illustrates an example of a flowchart that supports a memory cell sensing architecture in accordance with examples as disclosed herein.
Figure 4:
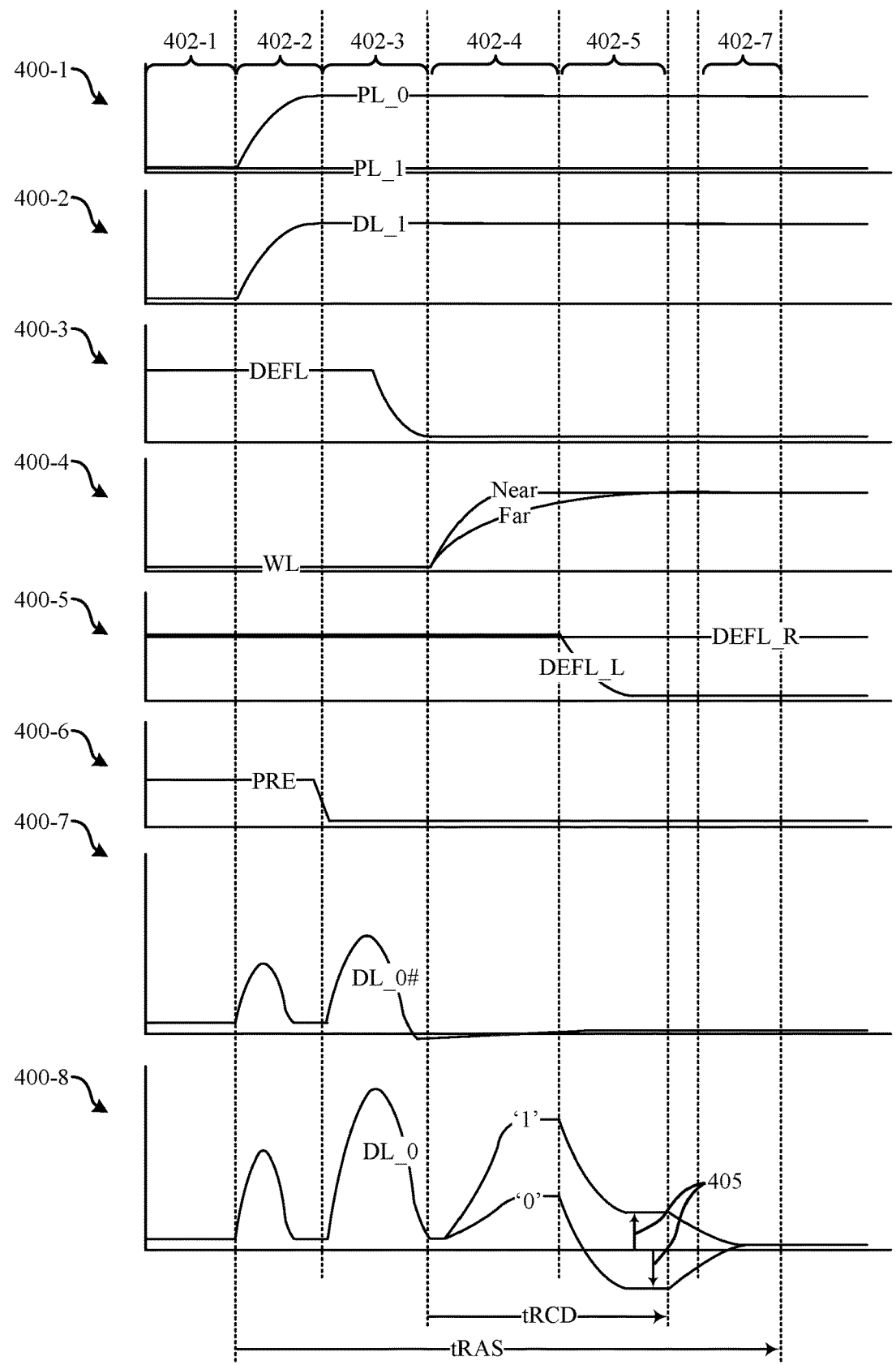
FIG. 4 illustrates an example of a timing diagram that supports a memory cell sensing architecture in accordance with examples as disclosed herein.
Figure 5:
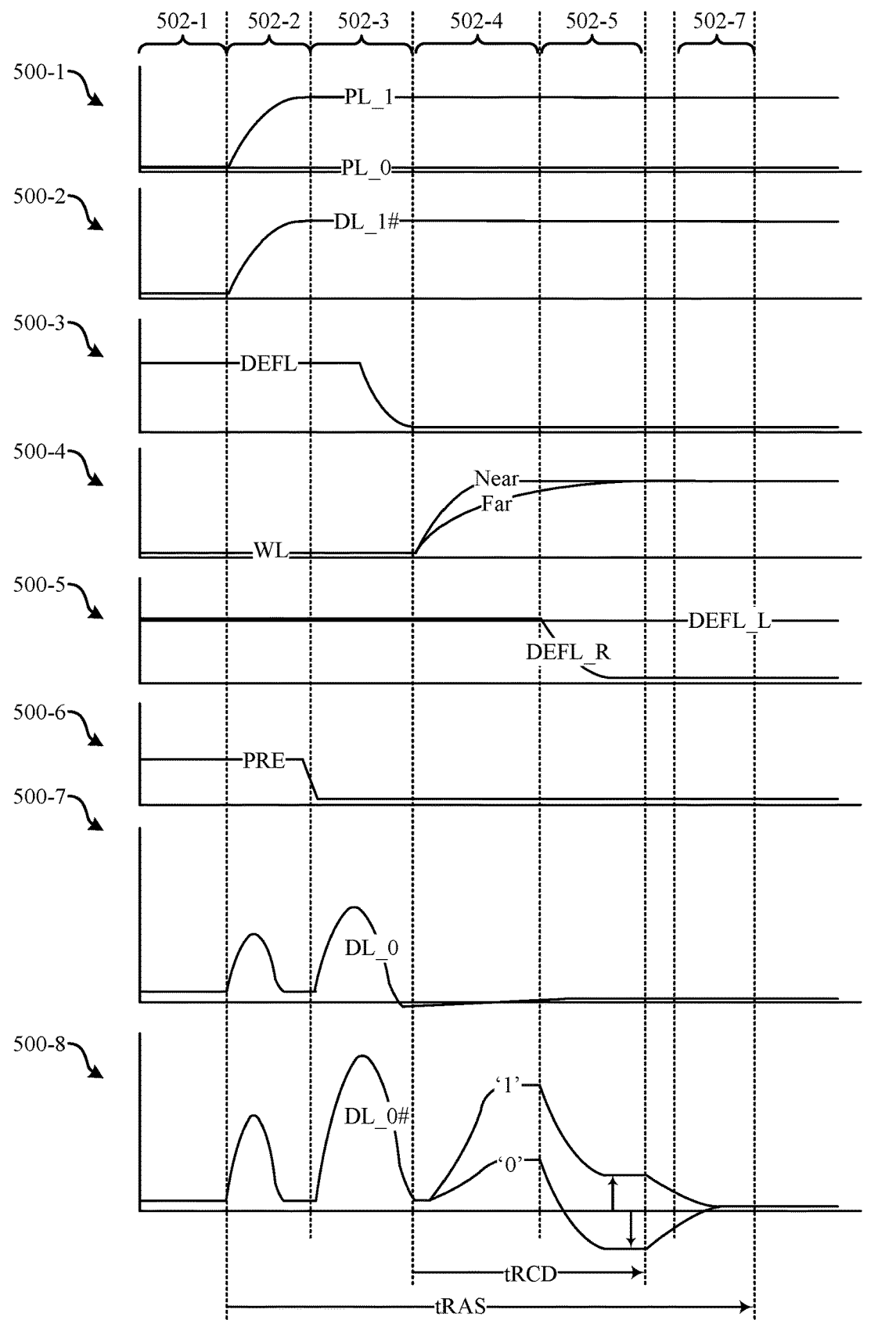
FIG. 5 illustrates an example of a timing diagram that supports a memory cell sensing architecture in accordance with examples as disclosed herein.

FIGS. 3-5 describe details associated with accessing a memory cell in a memory device that is configured in accordance with a paired memory cell architecture, including the operations for accessing the memory cell as well as responses of the circuitry used to access the memory cell. FIG. 3 illustrates an example of a set of operations for a memory cell sensing architecture in accordance with examples as disclosed herein.

The flowchart 300 may be performed by a memory controller described herein, such as the local memory controller 165 described with reference to FIG. 1. In some examples, the flowchart 300 illustrates an example set of operations performed to support a memory cell sensing architecture. For example, the flowchart 300 may include operations for accessing an individual memory cell in a memory device that is configured in accordance with a paired memory cell architecture.

Aspects of the flowchart 300 may be implemented by a controller, among other components. Additionally, or alternatively, aspects of the flowchart 300 may be implemented as instructions stored in memory (e.g., firmware stored in a memory coupled with a controller). For example, the instructions, when executed by a controller, may cause the controller to perform the operations of the flowchart 300.

One or more of the operations described in the flowchart 300 may be performed earlier or later, omitted, replaced, supplemented, or combined with another operation. Also, additional operations described herein may replace, supplement or be combined with one or more of the operations described in the flowchart 300.

At 305, an access command for a memory cell (e.g., the first memory cell 205-1 of FIG. 2) that is included in a first set of memory cells (e.g., the first memory cell 205-1 and the second memory cell 205-2 of FIG. 2) may be received. The access command may be a read command, a write command, and the like.

At 310, the bit lines associated with the memory cell may be connected to a ground reference voltage—e.g., to remove inadvertently developed voltage. The bit lines may include a first bit line coupled with the memory cell (e.g., the first bit line 215-1 of FIG. 2) and the referential bit line (e.g., the third bit line 215-3 of FIG. 2) used as a reference for a subsequent sensing operation. The referential bit line may be coupled with a second set of memory cells (e.g., the third memory cell 205-3 and the fourth memory cell 205-4 of FIG. 2). Connecting the bit lines to the ground reference voltage may include applying or maintaining (e.g., by a voltage source such as the fifth voltage source 250-5 of FIG. 2) an activating voltage to precharge switches (e.g., the precharge switches 270 of FIG. 2) that selectively couple the bit lines to the ground reference.

The voltage applied to the precharge switches may be represented by the PRE line in the sixth timing diagram 400-6 of FIG. 4. Also, the voltage of the referential bit line (throughout the access operation) may be represented by the DL_0# line in the seventh timing diagram 400-7 of FIG. 4, and the voltage of the first bit line coupled with the memory cell (throughout the access operation) may be represented by the DL_0 line in the eighth timing diagram 400-8 of FIG. 4. The DL0 line may show a voltage of the DL_0 line in two scenarios—a scenario where the memory cell has a first charge state (corresponding to a logic value 0) and a scenario where the memory cell has a second charge state (corresponding to a logic value 1).

At 315, a first plate line (e.g., the first plate line 220-1 of FIG. 2) coupled with the memory cell may be activated. Activating the first plate line may include applying a voltage (e.g., a high voltage) to the first plate line. The voltage applied to the first plate line coupled with the memory cell may be represented by the PL_0 line in the first timing diagram 400-1 of FIG. 4. A second plate line (e.g., the second plate line 220-2 of FIG. 2) coupled with the second set of memory cells may remain deactivated—e.g., throughout the access operation. Maintaining the second plate line in a deactivated state may include applying a voltage (e.g., a low voltage to the second plate line. The voltage applied to the plate line coupled with the second set of memory cells may be represented by the PL_1 line in the first timing diagram 400-1.

In some examples, activating the first plate line may cause similar voltages to develop on the first bit line and the referential bit line. Also, based on the bit lines being connected to the ground reference, the voltages of the bit lines may be driven back near the ground reference voltage, as shown in the second section 402-2 (which may be referred to the precharge phase) of the seventh timing diagram 400-7 and the eighth timing diagram 400-8.

At 320, a voltage of the inactive bit line (e.g., the second bit line 215-2 of FIG. 2) coupled with the first set of memory cells may be set to a voltage that prevents the second memory cell 205-2 from releasing charge to the bit line when the plate line is activated. The voltage may be equivalent to or offset from the voltage applied to the plate line—e.g., based on activating a switch that selectively couples the plate line and the bit line. The voltage of the inactive bit line may be set before or concurrently with the activation of the plate line. The voltage applied to the inactive bit line may be represented by the DL_1 line in the second timing diagram 400-2 of FIG. 4.

At 325, the active bit lines (e.g., the first bit line 215-1 and the third bit line 215-3) may be isolated from the ground reference. Isolating the active bit lines from the ground reference may include applying a deactivating voltage to the precharge switches, as represented in the sixth timing diagram 400-6.

At 330, a voltage may develop on the active bit lines (the first bit line and the referential bit line) as a result of a voltage offset of a latch (e.g., the latch 260 of FIG. 2) coupled with the active bit lines. The voltages that develops on the active bit lines may result from driving the transistors of cross-coupled inverters in a diode mode, which may cause the threshold voltage of the transistors to develop on the active bit lines. In such cases, the voltages of the nodes of the latch may be offset based on a difference between the threshold voltages of the transistors.

To compensate for the developed voltage from the active bit lines (while maintaining the offset), a voltage source (e.g., the third voltage source 250-3) may adjust (e.g., reduce) a voltage applied to first nodes of capacitors (e.g., the third capacitor 255-3 and the fourth capacitor 255-4) that have second node coupled with the active bit lines, which may cause a similar adjustment to a voltage of the active bit lines. The voltage of the voltage source may be represented by the DEFL line in the third timing diagram 400-3. The adjustment of the voltage output by the voltage source may be shown in the third section 402-3 (which may be referred to as the offset compensation phase) of the third timing diagram 400-3 of FIG. 4. Also, the similar adjustment of the voltages of the active bit lines may be shown in the third section 402-3 of the seventh timing diagram 400-7 and the third section 402-3 of the eighth timing diagram 400-8.

At 335, a word line (e.g., the word line 210 of FIG. 2) that is coupled with the first set of memory cells (that include the memory cell to be accessed) and the second set of memory cells may be activated. Activating the word line may include applying a voltage (e.g., a high voltage) to the word line. The voltage applied to the word line may be represented by the WL line in the fourth timing diagram 400-4 of FIG. 4. The WL line may show a voltage measured at a portion of the word line (e.g., a beginning of the word line) that is near to the voltage source and a portion of the word line (e.g., an end of the word line) that is far from the voltage source.

In combination with the first plate line (e.g., the first plate line 220-1) being activated, activating the word line may cause a voltage to be applied across the memory cell to be accessed (e.g., the first memory cell 205-1), where the voltage may be equivalent to a difference between the voltage of the first plate line and the voltage of the first bit line (e.g., the first bit line 215-1). The voltage applied across the memory cell may cause the memory cell to release stored charge to the first bit line, where the amount of released charge may be based on a charge state of the memory cell. For example, if the memory cell is storing a charge state corresponding to a logic value 1, more charge may be released to the first bit line than if the memory cell is storing a charge state corresponding to a logic value 0. Accordingly, the voltage of the first bit line may change (in accordance with the logic value stored by the memory cell), as shown in the fourth section 402-4 of the eighth timing diagram 400-8.

Because the voltage (represented by DL_1 in FIG. 4) of the inactive bit line (e.g., the second bit line 215-2) has been set to a voltage that is equivalent to or offset from the voltage of the first plate line (represented by PL_0 in FIG. 4), the charge stored by the second memory cell (e.g., the second memory cell 205-2) in the first set of memory cells may not be released to the inactive bit line. Also, because the second plate line (e.g., the second plate line 220-2, PL_1) has not been activated and based on the voltage (represented by DL_0#) of the referential bit line being near ground, a third memory cell in the second set of memory cells (e.g., the third memory cell 205-3) may not release/pull charge to/from the referential bit line (e.g., the third bit line 215-3). Additionally, because the second plate line (e.g., the second plate line 220-2, PL_1) has not been activated, a fourth memory cell in the second set of memory cells (e.g., the fourth memory cell 205-4) may not release charge to the other inactive bit line (e.g., the fourth bit line 215-4).

At 340, a voltage of the first bit line may be adjusted—e.g., so that a ground reference voltage may be used to determine the voltage of the first bit line. Adjusting (e.g., reducing) the voltage of the first bit line may include adjusting (e.g., by a voltage source such as the first voltage source 250-1) a voltage applied to a first node of a capacitor (e.g., the first capacitor 255-1) that has a second node coupled with the first bit line, which may cause a commensurate adjustment to a voltage of the first bit line. The voltage of the voltage source may be represented by the DEFL_L line in the third timing diagram. The adjustment of the voltage output by the voltage source may be shown in the fifth section 402-5 of the fifth timing diagram 400-5 of FIG. 4. Also, the similar adjustment of the voltage of the first bit lines may be shown in the fifth section 402-5 of the eighth timing diagram 400-8. As depicted in FIG. 4, a voltage of the DEFL_R line may remain constant throughout the access operation.

At 345, a voltage of the first bit line (e.g., the first bit line 215-1) may be compared with a voltage of the referential bit line (e.g., the third bit line 215-3). For example, a voltage (as represented by DL0) of the first bit line at the end of the fifth section 402-5 of the eighth timing diagram 400-8 may be compared with a voltage (as represented by DL_0#) of the referential bit line at the end of the fifth section 402-5 of the seventh timing diagram 400-7. In some examples, if the voltage of the first bit line is greater than the voltage of the referential bit line, then the latch may latch a high voltage that represents a first logic value (e.g., logic value 1). Alternatively, if the voltage of the first bit line is less than the voltage of the referential bit line, then the latch may latch a low voltage that represents a second logic value (e.g., logic value 0).

As described herein, each of the memory cells may independently store a logic value. For example, the other memory cell (e.g., the second memory cell 205-2) in the set of memory cells that includes the accessed memory cells may store a logic value that is independent of the logic value stored at the accessed memory cell. That is, the logic value stored at the other memory cell may be the same or different than the logic value stored at the accessed memory cell. Accordingly, a similar procedure may be performed to read a logic value stored at the other memory cell except that the second timing diagram 400-2 may instead depict a voltage of DL_0, the seventh timing diagram 400-7 may instead depict a voltage of DL_1#, and the eighth timing diagram 400-8 may instead depict a voltage of DL_1.

Also, in some examples, the memory cell coupled with the referential bit line (e.g., the third memory cell 205-3) may store a logic value that is independent of the logic value stored at the accessed memory cell. Accordingly, a similar procedure may be performed to read a logic value stored at the memory cell coupled with the referential bit line—e.g., with some modifications shown in FIG. 5.

FIG. 4 illustrates example timing diagrams that support a memory cell sensing architecture in accordance with examples as disclosed herein. The timing diagrams 400 depict voltages at different locations of a sensing circuit (e.g., such as the sensing circuit shown in subsystem 200 of FIG. 2). In some examples, a duration associated with a timing between executing an activate command and a precharge command is shown by tRAS. Also, a duration associated with opening a row and accessing a memory cell may be shown by tRCD. The eighth timing diagram 400-8 may include an indication of the sensing windows 405 associated with sensing a logic value stored by a memory cell. As depicted in FIG. 4, the scale for the seventh timing diagram 400-7 and the eighth timing diagram 400-8 may be expanded relative to the scale of the other timing diagrams (e.g., relative to the third timing diagram 400-3 and the fifth timing diagram 400-5). In some examples, the DEFL, and DEFL_L voltages may change by an equivalent amount as the DL0 and DL0# voltages.

FIG. 5 illustrates example timing diagrams that support a memory cell sensing architecture in accordance with examples as disclosed herein. The timing diagrams 500 depict voltages at different locations of a sensing circuit (e.g., such as the sensing circuit shown in subsystem 200 of FIG. 2). In some examples, the timing diagrams 500 depict the voltages of the sensing circuit if a memory cell coupled with a referential bit line (e.g., the third memory cell 205-3) is read. As depicted in FIG. 5, the scale for the seventh timing diagram 500-7 and the eighth timing diagram 500-8 may be expanded relative to the scale of the other timing diagrams (e.g., relative to the third timing diagram 500-3 and the fifth timing diagram 500-5). In some examples, the DEFL, and DEFL_R voltages may change by an equivalent amount as the DL0 and DL0# voltages.

Figure 6:
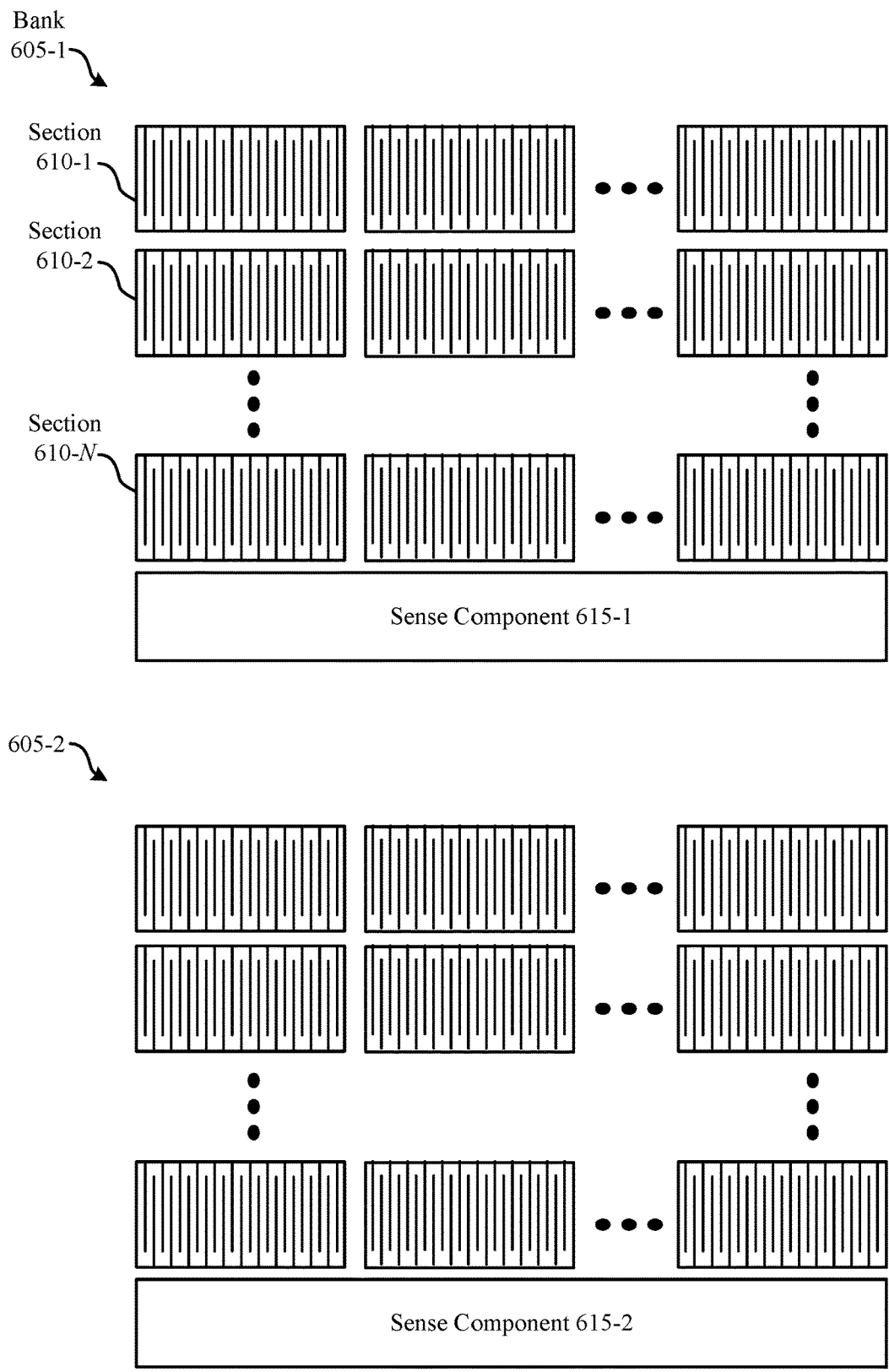
FIG. 6 illustrates an example of a subsystem that supports a memory cell sensing architecture in accordance with examples as disclosed herein.

FIG. 6 illustrates an example of a subsystem that supports a memory cell sensing architecture in accordance with examples as disclosed herein.

The subsystem 600 may include banks of memory (e.g., the first memory bank 605-1, the second memory bank 605-2). Each bank may include one or more sections and one or more sense components. For example, the first memory bank 605-1 may include a set of sections (e.g., the first section 610-1, the second section 610-2, and the Nth section 610-N) and one or more sense components (e.g., the first sense component 615-1). The first section 610-1 may include an array of memory cells that are accessible using referential bit lines that are also located in the first section 610-1.

By contrast, an open bit line sensing architecture may use referential bit lines in a different section (e.g., the second section 610-2) to access memory cells in another section (e.g., the first section 610-1). In such cases, intermediary sense components may be located between sections so that a voltage of a bit line in one section can be compared against a voltage of a bit line in another section. However, a subset of the bit lines in certain sections of a bank may be unable to connect to an intermediary sense component. For example, the intermediary sense component 615-1 may be unable to access a subset of the bit lines in the peripheral sections (e.g., the first section 610-1). Accordingly, the memory cells connected to the subset of the bit lines may be inoperable, and a storage density of memory devices configured in accordance with an open digit line architecture may be decreased—e.g., relative to the sensing architecture/techniques described herein.

Figure 7:
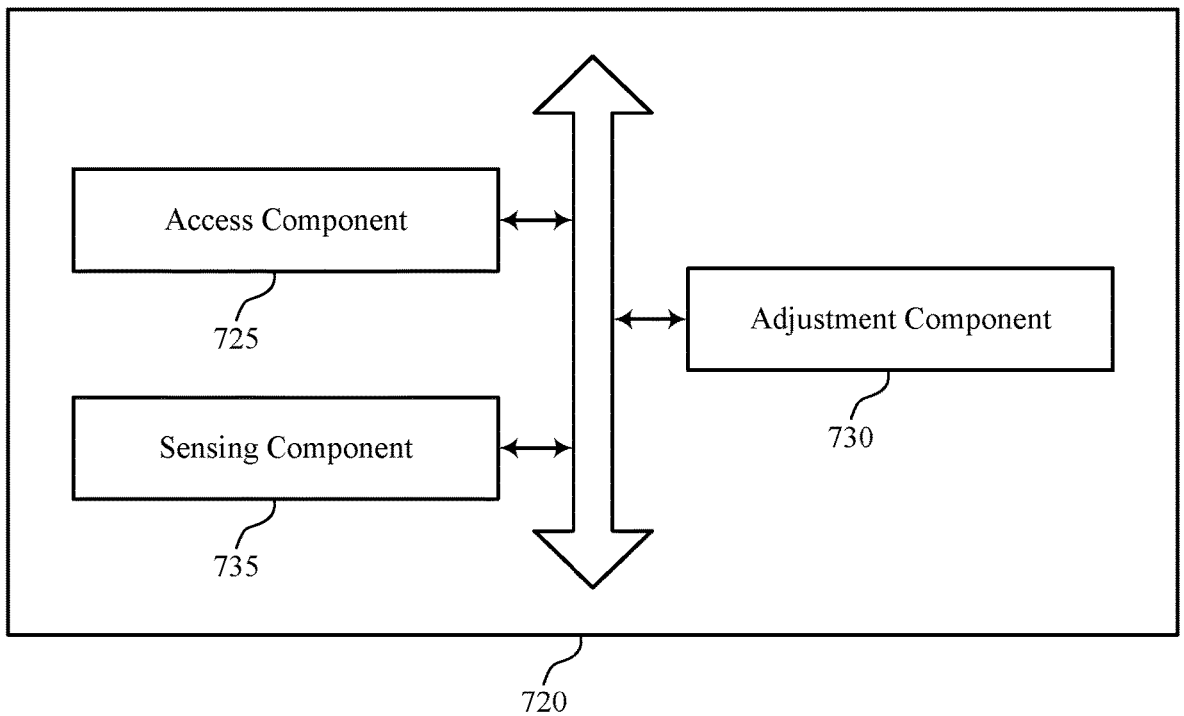
FIG. 7 illustrates a block diagram of a memory system that supports a memory cell sensing architecture in accordance with examples as disclosed herein.

FIG. 7 illustrates a block diagram 700 of a memory system 720 that supports a memory cell sensing architecture in accordance with examples as disclosed herein. The memory system 720 may be an example of aspects of a memory system as described with reference to FIGS. 1 through 5. The memory system 720, or various components thereof, may be an example of means for performing various aspects of memory cell sensing architecture as described herein. For example, the memory system 720 may include an access component 725, an adjustment component 730, a sensing component 735, or any combination thereof. Each of these components may communicate, directly or indirectly, with one another (e.g., via one or more buses).

The access component 725 may be configured as or otherwise support a means for activating a first plate line that is coupled with a first set of memory cells. The adjustment component 730 may be configured as or otherwise support a means for applying, after activating the first plate line, a first voltage to a set of capacitors coupled with a first bit line that is coupled with a first memory cell of the first set of memory cells and coupled with a second bit line that is coupled with a first memory cell of a second set of memory cells, where the second set of memory cells are coupled with a second plate line, and where a voltage of the first bit line and a voltage of the second bit line are concurrently adjusted based on applying the first voltage to the set of capacitors. In some examples, the access component 725 may be configured as or otherwise support a means for activating, based on activating the first plate line and adjusting the voltage of the first bit line and the voltage of the second bit line, a word line that is coupled with the first set of memory cells and the second set of memory cells, where the first memory cell of the first set of memory cells releases charge to the first bit line based on the first plate line and the word line being activated. In some examples, the adjustment component 730 may be configured as or otherwise support a means for applying, after activating the word line, a second voltage to a first capacitor coupled with the first bit line to adjust the voltage of the first bit line. The sensing component 735 may be configured as or otherwise support a means for determining, after applying the second voltage to the first capacitor, a logic value stored by the first memory cell of the first set of memory cells based on the voltage of the first bit line relative to the voltage of the second bit line.

In some examples, a second memory cell of the first set of memory cells is coupled with a third bit line, and the access component 725 may be configured as or otherwise support a means for setting a voltage of the third bit line to a first voltage level, where a charge of the second memory cell of the first set of memory cells is retained after the word line and the first plate line are activated based on the voltage of the third bit line being set to the first voltage level. In some examples, a second memory cell of the first set of memory cells is coupled with a third bit line, and the access component 725 may be configured as or otherwise support a means for maintaining a voltage of the second plate line that is coupled with the second set of memory cells at a second voltage level, where a charge of the second set of memory cells is retained after the word line is activated based on the second plate line remaining deactivated.

In some examples, the access component 725 may be configured as or otherwise support a means for activating a second plate line that is coupled with the second set of memory cells. In some examples, the adjustment component 730 may be configured as or otherwise support a means for applying, after activating the second plate line, the first voltage to the set of capacitors coupled with the first bit line and the second bit line to concurrently adjust the voltage of the first bit line and the voltage of the second bit line. In some examples, the access component 725 may be configured as or otherwise support a means for activating, based on activating the second plate line and again adjusting the voltage of the first bit line and the second bit line, the word line, where a first memory cell of the second set of memory cells releases charge to the second bit line based on the second plate line and the word line being activated. In some examples, the adjustment component 730 may be configured as or otherwise support a means for applying, after again activating the word line, a third voltage to a second capacitor coupled with the second bit line to adjust the voltage of the second bit line. In some examples, the sensing component 735 may be configured as or otherwise support a means for determining, after applying the third voltage to the second capacitor, a logic value stored by the first memory cell of the second set of memory cells based on the voltage of the first bit line relative to the voltage of the second bit line.

In some examples, the access component 725 may be configured as or otherwise support a means for activating, for a second time, the first plate line that is coupled with the first set of memory cells. In some examples, the adjustment component 730 may be configured as or otherwise support a means for applying, after activating the first plate line for the second time, the first voltage to the set of capacitors coupled with a third bit line that is coupled with a second memory cell of the first set of memory cells and coupled with a fourth bit line that is coupled with a second memory cell of the second set of memory cells, where a voltage of the third bit line and a voltage of the fourth bit line are concurrently adjusted based on applying the first voltage to the set of capacitors. In some examples, the access component 725 may be configured as or otherwise support a means for activating, based on activating the first plate line for the second time and adjusting the voltage of the third bit line and the fourth bit line, the word line, where the second memory cell of the first set of memory cells releases charge to the third bit line based on the first plate line and the word line being activated. In some examples, the adjustment component 730 may be configured as or otherwise support a means for applying, after again activating the word line, the second voltage to the first capacitor coupled with the third bit line to adjust the voltage of the third bit line. In some examples, the sensing component 735 may be configured as or otherwise support a means for determining, after again applying the second voltage to the first capacitor, a logic value stored by the second memory cell of the first set of memory cells based on the voltage of the third bit line relative to the voltage of the fourth bit line.

In some examples, the access component 725 may be configured as or otherwise support a means for setting the voltage of the first bit line to a first voltage level, where a charge of the first memory cell of the first set of memory cells is retained after the word line and the first plate line are activated based on the voltage of the first bit line being set to the first voltage level. In some examples, the access component 725 may be configured as or otherwise support a means for maintaining a voltage of a second plate line that is coupled with the second set of memory cells at a second voltage level, where a charge of the second set of memory cells is retained after the word line is activated based on the second plate line remaining deactivated.

In some examples, the first memory cell of the first set of memory cells stores a first logic value and a second memory cell of the second set of memory cells store the first logic value at the same time as the first memory cell.

Figure 8:
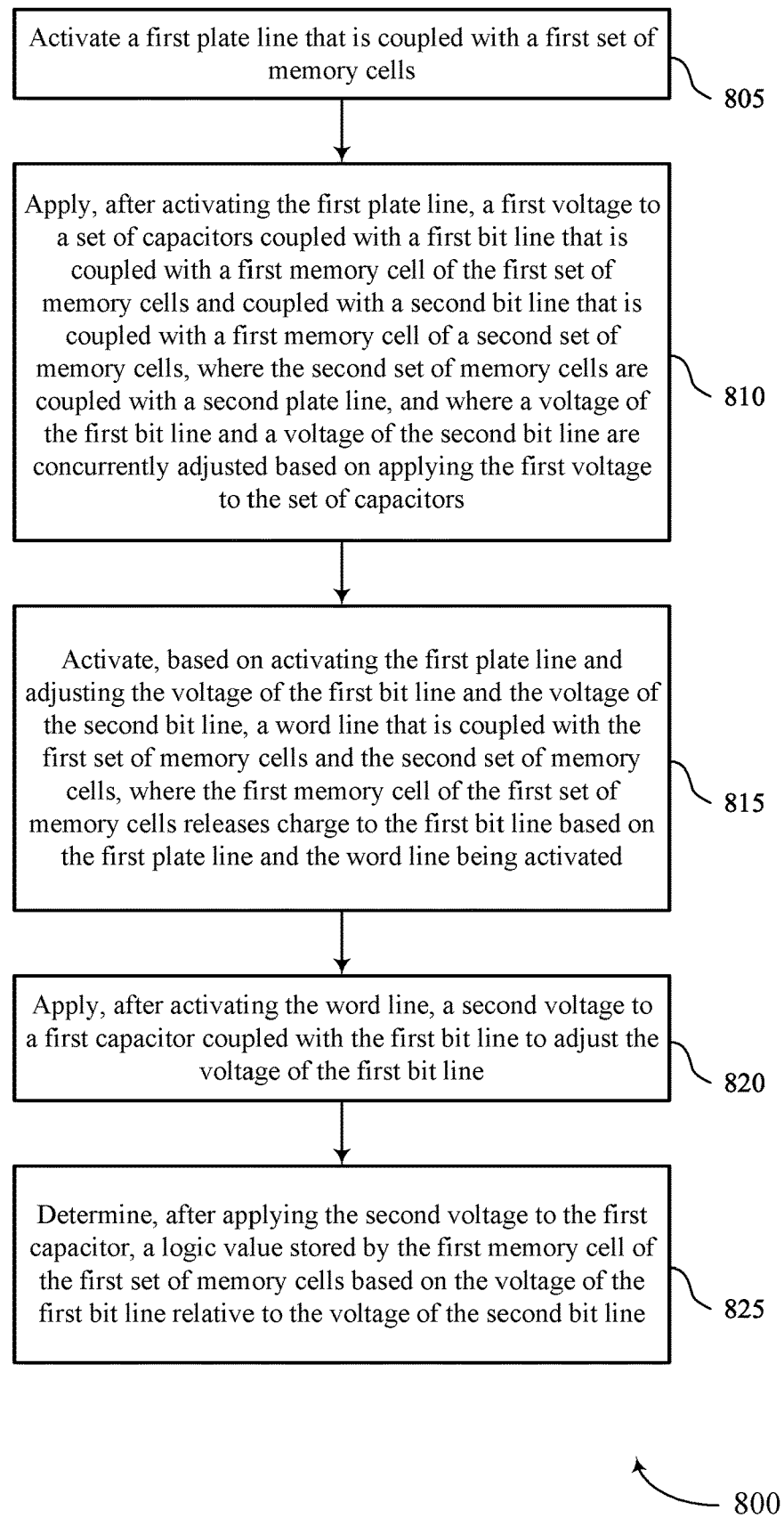
FIG. 8 illustrates a flowchart showing a method or methods that support a memory cell sensing architecture in accordance with examples as disclosed herein.

FIG. 8 illustrates a flowchart showing a method 800 that supports a memory cell sensing architecture in accordance with examples as disclosed herein. The operations of method 800 may be implemented by a memory system or its components as described herein. For example, the operations of method 800 may be performed by a memory system as described with reference to FIGS. 1 through 7. In some examples, a memory system may execute a set of instructions to control the functional elements of the device to perform the described functions. Additionally, or alternatively, the memory system may perform aspects of the described functions using special-purpose hardware.

At 805, the method may include activating a first plate line that is coupled with a first set of memory cells. The operations of 805 may be performed in accordance with examples as disclosed herein. In some examples, aspects of the operations of 805 may be performed by an access component 725 as described with reference to FIG. 7.

At 810, the method may include applying, after activating the first plate line, a first voltage to a set of capacitors coupled with a first bit line that is coupled with a first memory cell of the first set of memory cells and coupled with a second bit line that is coupled with a first memory cell of a second set of memory cells, where the second set of memory cells are coupled with a second plate line, and where a voltage of the first bit line and a voltage of the second bit line are concurrently adjusted based on applying the first voltage to the set of capacitors. The operations of 810 may be performed in accordance with examples as disclosed herein. In some examples, aspects of the operations of 810 may be performed by an adjustment component 730 as described with reference to FIG. 7.

At 815, the method may include activating, based on activating the first plate line and adjusting the voltage of the first bit line and the voltage of the second bit line, a word line that is coupled with the first set of memory cells and the second set of memory cells, where the first memory cell of the first set of memory cells releases charge to the first bit line based on the first plate line and the word line being activated. The operations of 815 may be performed in accordance with examples as disclosed herein. In some examples, aspects of the operations of 815 may be performed by an access component 725 as described with reference to FIG. 7.

At 820, the method may include applying, after activating the word line, a second voltage to a first capacitor coupled with the first bit line to adjust the voltage of the first bit line. The operations of 820 may be performed in accordance with examples as disclosed herein. In some examples, aspects of the operations of 820 may be performed by an adjustment component 730 as described with reference to FIG. 7.

At 825, the method may include determining, after applying the second voltage to the first capacitor, a logic value stored by the first memory cell of the first set of memory cells based on the voltage of the first bit line relative to the voltage of the second bit line. The operations of 825 may be performed in accordance with examples as disclosed herein. In some examples, aspects of the operations of 825 may be performed by a sensing component 735 as described with reference to FIG. 7.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for activating a first plate line that is coupled with a first set of memory cells; applying, after activating the first plate line, a first voltage to a set of capacitors coupled with a first bit line that is coupled with a first memory cell of the first set of memory cells and coupled with a second bit line that is coupled with a first memory cell of a second set of memory cells, where the second set of memory cells are coupled with a second plate line, and where a voltage of the first bit line and a voltage of the second bit line are concurrently adjusted based on applying the first voltage to the set of capacitors; activating, based on activating the first plate line and adjusting the voltage of the first bit line and the voltage of the second bit line, a word line that is coupled with the first set of memory cells and the second set of memory cells, where the first memory cell of the first set of memory cells releases charge to the first bit line based on the first plate line and the word line being activated; applying, after activating the word line, a second voltage to a first capacitor coupled with the first bit line to adjust the voltage of the first bit line; and determining, after applying the second voltage to the first capacitor, a logic value stored by the first memory cell of the first set of memory cells based on the voltage of the first bit line relative to the voltage of the second bit line.

Aspect 2: The method, apparatus, or non-transitory computer-readable medium of aspect 1, where a second memory cell of the first set of memory cells is coupled with a third bit line and the method, apparatuses, and non-transitory computer-readable medium further includes operations, features, circuitry, logic, means, or instructions, or any combination thereof for setting a voltage of the third bit line to a first voltage level, where a charge of the second memory cell of the first set of memory cells is retained after the word line and the first plate line are activated based on the voltage of the third bit line being set to the first voltage level and maintaining a voltage of the second plate line that is coupled with the second set of memory cells at a second voltage level, where a charge of the second set of memory cells is retained after the word line is activated based on the second plate line remaining deactivated.

Aspect 3: The method, apparatus, or non-transitory computer-readable medium of any of aspects 1 through 2, further including operations, features, circuitry, logic, means, or instructions, or any combination thereof for activating a second plate line that is coupled with the second set of memory cells; applying, after activating the second plate line, the first voltage to the set of capacitors coupled with the first bit line and the second bit line to concurrently adjust the voltage of the first bit line and the voltage of the second bit line; activating, based on activating the second plate line and again adjusting the voltage of the first bit line and the second bit line, the word line, where a first memory cell of the second set of memory cells releases charge to the second bit line based on the second plate line and the word line being activated; applying, after again activating the word line, a third voltage to a second capacitor coupled with the second bit line to adjust the voltage of the second bit line; and determining, after applying the third voltage to the second capacitor, a logic value stored by the first memory cell of the second set of memory cells based on the voltage of the first bit line relative to the voltage of the second bit line.

Aspect 4: The method, apparatus, or non-transitory computer-readable medium of any of aspects 1 through 3, further including operations, features, circuitry, logic, means, or instructions, or any combination thereof for activating, for a second time, the first plate line that is coupled with the first set of memory cells; applying, after activating the first plate line for the second time, the first voltage to the set of capacitors coupled with a third bit line that is coupled with a second memory cell of the first set of memory cells and coupled with a fourth bit line that is coupled with a second memory cell of the second set of memory cells, where a voltage of the third bit line and a voltage of the fourth bit line are concurrently adjusted based on applying the first voltage to the set of capacitors; activating, based on activating the first plate line for the second time and adjusting the voltage of the third bit line and the fourth bit line, the word line, where the second memory cell of the first set of memory cells releases charge to the third bit line based on the first plate line and the word line being activated; applying, after again activating the word line, the second voltage to the first capacitor coupled with the third bit line to adjust the voltage of the third bit line; and determining, after again applying the second voltage to the first capacitor, a logic value stored by the second memory cell of the first set of memory cells based on the voltage of the third bit line relative to the voltage of the fourth bit line.

Aspect 5: The method, apparatus, or non-transitory computer-readable medium of aspect 4, further including operations, features, circuitry, logic, means, or instructions, or any combination thereof for setting the voltage of the first bit line to a first voltage level, where a charge of the first memory cell of the first set of memory cells is retained after the word line and the first plate line are activated based on the voltage of the first bit line being set to the first voltage level and maintaining a voltage of a second plate line that is coupled with the second set of memory cells at a second voltage level, where a charge of the second set of memory cells is retained after the word line is activated based on the second plate line remaining deactivated.

Aspect 6: The method, apparatus, or non-transitory computer-readable medium of any of aspects 1 through 5, where the first memory cell of the first set of memory cells stores a first logic value and a second memory cell of the second set of memory cells store the first logic value at a same time as the first memory cell.

It should be noted that the methods described herein are possible implementations, and that the operations and the steps may be rearranged or otherwise modified and that other implementations are possible. Furthermore, portions from two or more of the methods may be combined.

An apparatus is described. The following provides an overview of aspects of the apparatus as described herein:

Aspect 7: An apparatus, including: a first set of memory cells coupled with a first plate line and a word line, where a first memory cell of the first set of memory cells is coupled with a first bit line; a second set of memory cells coupled with a second plate line and the word line, where a first memory cell of the second set of memory cells is coupled with a second bit line; a latch having a first node selectively couplable with the first bit line and having a second node selectively couplable with the second bit line; a first capacitor coupled with the first node of the latch and a first voltage source, where the first voltage source is configured to adjust a voltage of the first node of the latch via the first capacitor; a second capacitor coupled with the second node of the latch and a second voltage source, where the second voltage source is configured to adjust a voltage of the second node of the latch via the second capacitor; and a set of capacitors coupled with the first node of the latch, the second node of the latch, and a third voltage source, where the third voltage source is configured to concurrently adjust the voltage of the first node of the latch and the voltage of the second node of the latch via the set of capacitors.

Aspect 8: The apparatus of aspect 7, where: a second memory cell of the first set of memory cells is coupled with the first plate line and a third bit line; and a second memory cell of the second set of memory cells is coupled with the second plate line and a fourth bit line.

Aspect 9: The apparatus of aspect 8, where: the first node of the latch is selectively couplable with the third bit line, and the second node of the latch is selectively couplable with the fourth bit line.

Aspect 10: The apparatus of any of aspects 7 through 9, further including: a first switch coupled with the first node of the latch and the first bit line and configured to selectively couple the first node of the latch with the first bit line; and a second switch coupled with the second node of the latch and the second bit line and configured to selectively couple the second node of the latch with the second bit line.

Aspect 11: The apparatus of any of aspects 7 through 10, further including: a first switch coupled with the first bit line and configured to selectively couple the first bit line with a reference voltage; and a second switch coupled with the second bit line and configured to selectively couple the second bit line with the reference voltage.

Aspect 12: The apparatus of any of aspects 7 through 11, where: the first set of memory cells includes a first set of transistors and a first set of storage elements, the first set of transistors includes a first transistor and a second transistor, and the first set of storage elements includes a first storage element and a second storage element; the second set of memory cells includes a second set of transistors and a second set of storage elements, the second set of transistors including a third transistor and a fourth transistor, and the second set of storage elements includes a third storage element and a fourth storage element; a gate of the first transistor is coupled with the word line, a drain of the first transistor is coupled with the first bit line, and a source of the first transistor is coupled with a storage element of the first set of storage elements; and a gate of the third transistor is coupled with the word line, a drain of the third transistor is coupled with the second bit line, and a source of the third transistor is coupled with a storage element of the second set of storage elements.

Aspect 13: The apparatus of any of aspects 7 through 12, where: the set of capacitors includes a third capacitor and a fourth capacitor, a first node of the third capacitor is coupled with the first bit line and a second node of the third capacitor is coupled with the third voltage source, and a first node of the fourth capacitor is coupled with the first bit line and a second node of the fourth capacitor is coupled with the third voltage source.

An apparatus is described. The following provides an overview of aspects of the apparatus as described herein:

Aspect 14: An apparatus, including: a first set of memory cells coupled with a first plate line and a word line, where a first memory cell of the first set of memory cells is coupled with a first bit line; a second set of memory cells coupled with a second plate line and the word line, where a first memory cell of the second set of memory cells is coupled with a second bit line; a latch having a latch circuit coupled between the first bit line and the second bit line; a set of capacitors coupled with a first control node, the first bit line, and the second bit line; a first capacitor coupled with a second control node and the first bit line; and a controller configured to: adjust a voltage of the first control node coupled with the set of capacitors to concurrently adjust a voltage of the first bit line and a voltage of the second bit line; activate the word line subsequent to adjusting the voltage of the first bit line and the voltage of the second bit line; and adjust, subsequent to activating the word line, a voltage of the second control node coupled with the first capacitor to adjust the voltage of the first bit line.

Aspect 15: The apparatus of aspect 14, where a second memory cell of the first set of memory cells is coupled with a third bit line, and where, to access the first memory cell of the first set of memory cells, the controller is further configured to: couple the third bit line to the first plate line prior to activating the word line; and adjust a voltage of the first plate line based at least in part on coupling the third bit line to the first plate line.

Aspect 16: The apparatus of aspect 15, further including: a switch coupled with the first bit line and a reference voltage, where, to access the first memory cell of the first set of memory cells, the controller is further configured to: isolate the first bit line from the reference voltage subsequent to adjusting the voltage of the first plate line.

Aspect 17: The apparatus of any of aspects 15 through 16, where, to access the first memory cell of the first set of memory cells, the controller is further configured to: detect an offset voltage associated with the latch circuit, where the voltage of the first bit line and the voltage of the second bit line prior to adjusting the voltage of the first control node are configured to compensate for the offset voltage associated with the latch circuit.

Aspect 18: The apparatus of aspect 17, where the controller is further configured to: adjust the voltage of the second control node coupled with the first capacitor after a duration since activating the word line has elapsed.

Aspect 19: The apparatus of any of aspects 15 through 18, where: the first memory cell of the first set of memory cells is configured to release charge to the first bit line based on the word line being activated and the voltage of the first plate line being adjusted, the second memory cell of the first set of memory cells is configured to retain charge based on the third bit line being coupled to the first plate line.

Aspect 20: The apparatus of aspect 19, where, to access the first memory cell of the first set of memory cells, the controller is further configured to: activate, after the word line is activated and based on the voltage of the second control node coupled with the first capacitor being adjusted, the latch circuit to latch a logic stage based at least in part on a difference between the voltage of the first bit line and the voltage of the second bit line.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Couplable may refer to one or more aspects that are operable to be coupled. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components from one another, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other cases, the substrate may be a silicon-on-insulator (SOI) substrate, such as silicon-on-glass (SOG) or silicon-on-sapphire (SOS), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component (e.g., a transistor) discussed herein may represent a field-effect transistor (FET), and may comprise a three-terminal component including a source (e.g., a source terminal), a drain (e.g., a drain terminal), and a gate (e.g., a gate terminal). The terminals may be connected to other electronic components through conductive materials (e.g., metals, alloys). The source and drain may be conductive, and may comprise a doped (e.g., heavily-doped, degenerate) semiconductor region. The source and drain may be separated by a doped (e.g., lightly-doped) semiconductor region or channel. If the channel is n-type (e.g., majority carriers are electrons), then the FET may be referred to as a n-type FET. If the channel is p-type (e.g., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a first set of memory cells coupled with a first plate line and a word line, wherein a first memory cell of the first set of memory cells is coupled with a first bit line;
a second set of memory cells coupled with a second plate line and the word line, wherein a first memory cell of the second set of memory cells is coupled with a second bit line;
a sense component having a first node selectively couplable with the first bit line and having a second node selectively couplable with the second bit line;
a first capacitor coupled with the first node of the sense component and a first voltage source, wherein the first voltage source is configured to adjust a voltage of the first node of the sense component via the first capacitor;
a second capacitor coupled with the second node of the sense component and a second voltage source, wherein the second voltage source is configured to adjust a voltage of the second node of the sense component via the second capacitor; and
a set of capacitors coupled with the first node of the sense component, the second node of the sense component, and a third voltage source, wherein the third voltage source is configured to concurrently adjust the voltage of the first node of the sense component and the voltage of the second node of the sense component via the set of capacitors.

2. The apparatus of claim 1, wherein:
a second memory cell of the first set of memory cells is coupled with the first plate line and a third bit line; and
a second memory cell of the second set of memory cells is coupled with the second plate line and a fourth bit line.

3. The apparatus of claim 2, wherein:
the first node of the sense component is selectively couplable with the third bit line, and
the second node of the sense component is selectively couplable with the fourth bit line.

4. The apparatus of claim 1, further comprising:
a first switch coupled with the first node of the sense component and the first bit line and configured to selectively couple the first node of the sense component with the first bit line; and
a second switch coupled with the second node of the sense component and the second bit line and configured to selectively couple the second node of the sense component with the second bit line.

5. The apparatus of claim 1, further comprising:
a first switch coupled with the first bit line and configured to selectively couple the first bit line with a reference voltage; and
a second switch coupled with the second bit line and configured to selectively couple the second bit line with the reference voltage.

6. The apparatus of claim 1, wherein:
the first set of memory cells comprises a first set of transistors and a first set of storage elements, the first set of transistors comprises a first transistor and a second transistor, and the first set of storage elements comprises a first storage element and a second storage element;
the second set of memory cells comprises a second set of transistors and a second set of storage elements, the second set of transistors comprising a third transistor and a fourth transistor, and the second set of storage elements comprises a third storage element and a fourth storage element;
a gate of the first transistor is coupled with the word line, a drain of the first transistor is coupled with the first bit line, and a source of the first transistor is coupled with a storage element of the first set of storage elements; and
a gate of the third transistor is coupled with the word line, a drain of the third transistor is coupled with the second bit line, and a source of the third transistor is coupled with a storage element of the second set of storage elements.

7. The apparatus of claim 1, wherein:
the set of capacitors comprises a third capacitor and a fourth capacitor,
a first node of the third capacitor is coupled with the first bit line and a second node of the third capacitor is coupled with the third voltage source, and
a first node of the fourth capacitor is coupled with the first bit line and a second node of the fourth capacitor is coupled with the third voltage source.

8. An apparatus, comprising:
a first set of memory cells coupled with a first plate line and a word line, wherein a first memory cell of the first set of memory cells is coupled with a first bit line;
a second set of memory cells coupled with a second plate line and the word line, wherein a first memory cell of the second set of memory cells is coupled with a second bit line;
a sense component having a latch circuit coupled between the first bit line and the second bit line;
a set of capacitors coupled with a first control node, the first bit line, and the second bit line;
a first capacitor coupled with a second control node and the first bit line; and
a controller configured to:
adjust a voltage of the first control node coupled with the set of capacitors to concurrently adjust a voltage of the first bit line and a voltage of the second bit line;

activate the word line subsequent to adjusting the voltage of the first bit line and the voltage of the second bit line; and adjust, subsequent to activating the word line, a voltage of the second control node coupled with the first capacitor to adjust the voltage of the first bit line.

9. The apparatus of claim 8, wherein a second memory cell of the first set of memory cells is coupled with a third bit line, and wherein, to access the first memory cell of the first set of memory cells, the controller is further configured to:

couple the third bit line to the first plate line prior to activating the word line; and adjust a voltage of the first plate line based at least in part on coupling the third bit line to the first plate line.

10. The apparatus of claim 9, further comprising:

a switch coupled with the first bit line and a reference voltage, wherein, to access the first memory cell of the first set of memory cells, the controller is further configured to:

isolate the first bit line from the reference voltage subsequent to adjusting the voltage of the first plate line.

11. The apparatus of claim 9, wherein, to access the first memory cell of the first set of memory cells, the controller is further configured to:

detect an offset voltage associated with the latch circuit, wherein the voltage of the first bit line and the voltage of the second bit line prior to adjusting the voltage of the first control node are configured to compensate for the offset voltage associated with the latch circuit.

12. The apparatus of claim 9, wherein:

the first memory cell of the first set of memory cells is configured to release charge to the first bit line based on the word line being activated and the voltage of the first plate line being adjusted, and the second memory cell of the first set of memory cells is configured to retain charge based on the third bit line being coupled to the first plate line.

13. The apparatus of claim 11, wherein the controller is further configured to:

adjust the voltage of the second control node coupled with the first capacitor after a duration since activating the word line has elapsed.

14. The apparatus of claim 12, wherein, to access the first memory cell of the first set of memory cells, the controller is further configured to:

activate, after the word line is activated and based on the voltage of the second control node coupled with the first capacitor being adjusted, the latch circuit to latch a logic stage based at least in part on a difference between the voltage of the first bit line and the voltage of the second bit line.

15. A method, comprising:

activating a first plate line that is coupled with a first set of memory cells;

applying, after activating the first plate line, a first voltage to a set of capacitors coupled with a first bit line that is coupled with a first memory cell of the first set of memory cells and coupled with a second bit line that is coupled with a first memory cell of a second set of memory cells, wherein the second set of memory cells are coupled with a second plate line, and wherein a voltage of the first bit line and a voltage of the second bit line are concurrently adjusted based on applying the first voltage to the set of capacitors;

activating, based on activating the first plate line and adjusting the voltage of the first bit line and the voltage of the second bit line, a word line that is coupled with the first set of memory cells and the second set of memory cells, wherein the first memory cell of the first set of memory cells releases charge to the first bit line based on the first plate line and the word line being activated;

applying, after activating the word line, a second voltage to a first capacitor coupled with the first bit line to adjust the voltage of the first bit line; and determining, after applying the second voltage to the first capacitor, a logic value stored by the first memory cell of the first set of memory cells based on the voltage of the first bit line relative to the voltage of the second bit line.

16. The method of claim 15, wherein a second memory cell of the first set of memory cells is coupled with a third bit line, the method further comprising:

setting a voltage of the third bit line to a first voltage level, wherein a charge of the second memory cell of the first set of memory cells is retained after the word line and the first plate line are activated based on the voltage of the third bit line being set to the first voltage level; and maintaining a voltage of the second plate line that is coupled with the second set of memory cells at a second voltage level, wherein a charge of the second set of memory cells is retained after the word line is activated based on the second plate line remaining deactivated.

17. The method of claim 15, further comprising:

activating the second plate line that is coupled with the second set of memory cells;

applying, after activating the second plate line, the first voltage to the set of capacitors coupled with the first bit line and the second bit line to concurrently adjust the voltage of the first bit line and the voltage of the second bit line;

activating, based on activating the second plate line and again adjusting the voltage of the first bit line and the second bit line, the word line, wherein a first memory cell of the second set of memory cells releases charge to the second bit line based on the second plate line and the word line being activated;

applying, after again activating the word line, a third voltage to a second capacitor coupled with the second bit line to adjust the voltage of the second bit line; and determining, after applying the third voltage to the second capacitor, a logic value stored by the first memory cell of the second set of memory cells based on the voltage of the first bit line relative to the voltage of the second bit line.

18. The method of claim 15, further comprising:

activating, for a second time, the first plate line that is coupled with the first set of memory cells;

applying, after activating the first plate line for the second time, the first voltage to the set of capacitors coupled with a third bit line that is coupled with a second memory cell of the first set of memory cells and coupled with a fourth bit line that is coupled with a second memory cell of the second set of memory cells, wherein a voltage of the third bit line and a voltage of the fourth bit line are concurrently adjusted based on applying the first voltage to the set of capacitors;

activating, based on activating the first plate line for the second time and adjusting the voltage of the third bit line and the fourth bit line, the word line, wherein the second memory cell of the first set of memory cells releases charge to the third bit line based on the first plate line and the word line being activated;

applying, after again activating the word line, the second voltage to the first capacitor coupled with the third bit line to adjust the voltage of the third bit line; and determining, after again applying the second voltage to the first capacitor, a logic value stored by the second memory cell of the first set of memory cells based on the voltage of the third bit line relative to the voltage of the fourth bit line.

19. The method of claim 18, further comprising:

setting the voltage of the first bit line to a first voltage level, wherein a charge of the first memory cell of the first set of memory cells is retained after the word line and the first plate line are activated based on the voltage of the first bit line being set to the first voltage level; and maintaining a voltage of the second plate line that is coupled with the second set of memory cells at a second voltage level, wherein a charge of the second set of memory cells is retained after the word line is activated based on the second plate line remaining deactivated.

20. The method of claim 15, wherein the first memory cell of the first set of memory cells stores a first logic value and a second memory cell of the second set of memory cells store the first logic value at a same time as the first memory cell.

\* \* \* \* \*